United States Patent Office 3,107,976
Patented Oct. 22, 1963

3,107,976
NIOBIUM-TANTALUM SEPARATION
Ernest L. Koerner, Tonawanda, N.Y., and Morton Smutz and Harley A. Wilhelm, Ames, Iowa, assignors to the United States of America as represented by the United States Atomic Energy Commission
No Drawing. Filed Nov. 29, 1957, Ser. No. 699,855
11 Claims. (Cl. 23—19)

This invention deals with the separation of niobium values from tantalum values present in ores and more specifically in oxidic ores.

Niobium and tantalum occur together in a number of ores, for instance, in the columbite-tantalite-type ores. These ores contain the niobium and the tantalum as the pentoxides mainly in association with ferrous oxides and manganous oxides. The columbite-tantalite ores correspond to the formula [(Nb, Ta)O$_3$]$_2$(Fe, Mn); these ores also contain small quantities of tin oxide, titanium oxide, aluminum oxide, and silica.

Niobium and tantalum have a great many utilities. Niobium, having a high melting point (2413° C.), high corrosion resistance, good high-temperature strength, is useful as construction material for equipment that has to be exposed to high temperatures and/or to corrosive atmospheres; for instance, niobium is a satisfactory material in alloys to be used for blades of gas turbines or for high-velocity, rapid-fire machine gun barrels. Niobium, furthermore, is an ingredient of many so-called special steels. On account of its low neutron-capture cross section (1.1 barns) niobium is a desirable construction material for neutronic reactors. For many of these uses pure niobium is required, in particular is a tantalum-free niobium desirable for the use in neutronic reactors because tantalum has the comparatively high neutron-capture cross section of 22 barns.

Tantalum has a still higher melting point (2849° C.) than niobium and thus is also qualified as construction material for equipment or machinery to be exposed to high temperatures. Furthermore, tantalum is also used as a component of many alloys.

For most of these uses niobium as well as tantalum are desired in a high degree of purity. Niobium and tantalum being in the same group of the periodic table of elements have many very similar chemical properties, and for this reason the separation of the two elements from each other is rather difficult.

It is an object of this invention to provide a process of separating tantalum from niobium which is simple and requires very few steps.

It is also an object of this invention to provide a process of separating tantalum from niobium in which the separation is achieved immediately after opening the ore.

These objects are accomplished by digesting the disintegrated ore containing niobium pentoxide, tantalum pentoxide and impurities in concentrated sulfuric acid at elevated temperatures; separating a residue from a sulfate liquor obtained; leaching the residue with water whereby a tantalum-rich hydroxide precipitate forms while the impurities remain in solution; separating the tantalum-rich precipitate and unreacted ore from the solution; selectively dissolving the tantalum-rich hydroxide in acid; separating unreacted ore from the tantalum solution formed; neutralizing the tantalum solution whereby again a tantalum-containing precipitate forms; separating said tantalum-containing precipitate from the solution; diluting the sulfate liquor with water whereby a niobium-rich hydroxide precipiate forms; and separating the niobium-rich precipitate from the sulfate liquor.

The ore is preferably treated in a finely divided form. The particle size may vary widely; a particle size of about —325 mesh was preferred.

The sulfuric acid for opening the ore is preferably concentrated sulfuric acid of from 90 to 98 percent. The preferred quantity of concentrated sulfuric acid is 5 parts by weight of sulfuric acid for each part of ore. The temperature for opening the ore may range from 200 to 400° C., but a temperature of about 300° C. is preferred. A digestion time of from one and one-half hours to 20 minutes, respectively, was found suitable; in the case of a temperature of about 300° C. digestion for one-half hour was sufficient and brought about an opening of about 70 percent of the ore. After the sulfuric treatment the residue is separated from the sulfate liquor; this may be carried out by any means known to those skilled in the art, filtration being the preferred means of separation.

The residue or filter cake is then leached with water, preferably with from 10 to 20 times the volume of the volume of the cake; however, these quantities may vary widely without affecting the operativeness of the process. In this leaching step a precipitate of tantalum hydroxide forms; it is separated, together with the unreacted ore, from the aqueous solution by means known to those skilled in the art. In this step a separation of the tantalum from the iron sulfate, which remains in the solution, is accomplished. The tantalum-hydroxide precipitate is separated from the unreacted ore by selectively dissolving the tantalum hydroxide, for example, in hydrofluoric acid, followed by filtration. The hydrofluoric acid solution is then neutralized, for instance, with ammonium hydroxide to yield a tantalum-rich hydroxide precipitate; the precipitate is separated from the aqueous solution by means known to those skilled in the art. The unreacted ore residue can be washed with water and recycled for another sulfuric acid treatment. In this case the wash water is added to the hydrofluoric acid solution.

In order to process the sulfate liquor, water is added. A ratio of from 10 to 20 volumes of water per one volume of sulfate liquor was found satisfactory. Also in this instance a precipitate forms which primarily consists of niobium hydroxide. This precipitate is separated from the solution.

The niobium and tantalum hydroxides can be dissolved and be subjected to further purification; however, this phase is not part of the invention. Or else, the hydroxides can be calcined at about 1000° C. whereby they are converted to the pentoxides, the material suitable for the reduction to the metal.

In the following an example is given to illustrate the process of this invention but not to limit it to the details given therein.

Example

Ground columbite ore, 1.5 lbs., containing about 50 percent by weight of niobium pentoxide and 17 percent of tantalum pentoxide and having a particle size of —325 mesh was immersed in 7.5 lbs. of a 93 percent sulfuric acid. The mixture was maintained at 300° C. for 30 minutes. After this the mixture was allowed to cool to about 200° C., and the undissolved residue was separated from the sulfate liquor by filtration.

The sulfate liquor was then diluted with 60 liters of water. A precipitate formed which was filtered off, dried at 125° C., calcined at 1000° C. and analyzed; it was found to contain 79.5 percent $Nb_2O_5$, 19.5 percent $Ta_3O_5$ and about one percent of impurities, mainly $TiO_2$.

To the residue there were then added 15 liters of water. A precipitate together with unreacted ore settled at the bottom of the container which were filtered off and washed with one liter of water. Three liters of a 20 percent hydrofluoric acid were then added to the filter cake. The insolubles, the unreacted ore, were removed by filtration, washed with one liter of water and dried. Analysis showed that the unreacted ore contained about 25 percent $Ta_2O_5$ and 28.5 percent $Nb_2O_5$.

To the hydrofluoric acid solution there was then added one pound of ammonium hydroxide. A precipitate settled at the bottom of the container which was filtered off, dried, calcined, and analyzed as described in connection with the niobium-containing precipitate. The calcined precipitate proved to contain 83 percent of tantalum pentoxide and about 15 percent of niobium pentoxide with approximately 2 percent impurities, notably titanium oxide.

It will be understood that this invention is not to be limited to the details given herein, but that it may be modified within the scope of the appended claims.

What is claimed is:

1. A process of separately recovering in pure form niobium values and tantalum values contained in an oxidic ore, consisting of grinding said oxidic ore; digesting said oxidic ore with a medium consisting of concentrated sulfuric acid at a temperature of between 200 and 400° C., whereby an insoluble residue and a sulfate liquor are obtained; separating the residue from the sulfate liquor; leaching the residue with water whereby a tantalum-rich hydroxide is obtained, while the bulk of the impurities remain in solution; separating the tantalum-rich precipitate and unreacted ore from the solution; selectively dissolving the tantalum-rich hydroxide in hydrofluoric acid; separating unreacted ore from the tantalum solution formed; neutralizing the tantalum solution with ammonium hydroxide whereby tantalum hydroxide precipitates; separating said tantalum hydroxide from the solution; diluting the sulfate liquor with water whereby a niobium-rich hydroxide precipitate forms; and separating the niobium-rich precipitate from the sulfate liquor.

2. The process of claim 1 wherein the sulfuric acid has a concentration of from 90 to 98 percent.

3. The process of claim 2 wherein about 5 parts by weight of sulfuric acid are used per one part of ore.

4. The process of claim 2 wherein the sulfuric acid has a concentration of about 93 percent and digestion is carried out at about 300° C. for about one-half hour.

5. The process of claim 2 wherein the residue is leached with from 10 to 20 volumes of water per volume of residue.

6. The process of claim 5 wherein 15 volumes of water are used for 1 volume of residue.

7. The process of claim 2 wherein each volume of sulfate liquor is diluted with from 10 to 20 volumes of water.

8. The process of claim 7 wherein 15 volumes of water are used for each volume of sulfate liquor.

9. A process of separately recovering in relatively pure form niobium values and tantalum values contained in an oxidic ore consisting of grinding said ore to −325 mesh; digesting said ore with 5 parts by weight of a medium consisting of 93 percent sulfuric acid per one part by weight of ore at about 300° C. for one-half hour whereby an insoluble residue and a sulfate liquor are obtained; separating said residue from said sulfate liquor; leaching said residue with 15 volumes of water per volume of residue whereby a tantalum-rich hydroxide is obtained while the bulk of the impurities remains in solution; separating the tantalum-rich precipitate and unreacted ore from the solution; adding aqueous hydrofluoric acid to the precipitate and unreacted ore, whereby the tantalum precipitate is dissolved; filtering the unreacted ore from the hydrofluoric solution; neutralizing the hydrofluoric acid solution with ammonium hydroxide whereby tantalum hydroxide precipitates; separating the tantalum hydroxide from the solution; diluting each volume of sulfate liquor with about 15 volumes of water whereby a niobium-rich hydroxide precipitate forms; and separating the niobium-rich precipitate from the sulfate liquor.

10. The process of claim 1 wherein the separated unreacted ore is recycled for processing.

11. A process of separating niobium values from tantalum values contained in an oxidic ore, consisting of grinding said ore, digesting said ore with a medium consisting of sulfuric acid of a concentration of between 90 and 98 percent at a temperature of between 200 and 400° C., and separating a tantalum-containing residue from a niobium-containing solution.

References Cited in the file of this patent

UNITED STATES PATENTS

| 2,259,396 | Schlect et al. | Oct. 14, 1941 |
| 2,537,316 | Oppegaard | Jan. 9, 1951 |
| 2,795,481 | Hicks et al. | June 11, 1957 |

OTHER REFERENCES

Mellor: "Comprehensive Treatise on Inorganic and Theoretical Chemistry," published by Longmans, Green & Company, New York, volume 9, 1929, pages 899 and 915.

Hampel: "Rare Metals Handbook," published by Rheinhold Publishing Company, New York, 1954, pages 390 to 393 inclusive.

Hopkins: "Chemistry of the Rarer Elements," published by D. C. Heath & Co., New York, page 227.